(12) United States Patent
Zumkehr et al.

(10) Patent No.: US 6,622,227 B2
(45) Date of Patent: Sep. 16, 2003

(54) METHOD AND APPARATUS FOR UTILIZING WRITE BUFFERS IN MEMORY CONTROL/INTERFACE

(75) Inventors: John F. Zumkehr, Orange, CA (US); Pete D. Vogt, Boulder, CO (US)

(73) Assignee: Intel Corporation, Santa Clara, CA (US)

( * ) Notice: Subject to any disclaimer, the term of this patent is extended or adjusted under 35 U.S.C. 154(b) by 352 days.

(21) Appl. No.: 09/749,074

(22) Filed: Dec. 27, 2000

(65) Prior Publication Data

US 2002/0083287 A1 Jun. 27, 2002

(51) Int. Cl.[7] .............................................. G06F 12/06
(52) U.S. Cl. ....................................................... 711/167
(58) Field of Search ................................. 711/167, 169

(56) References Cited

U.S. PATENT DOCUMENTS

| | | | | | |
|---|---|---|---|---|---|
| 4,750,154 A | * | 6/1988 | Lefsky et al. | ............... | 365/189 |
| 6,047,361 A | * | 4/2000 | Ingenio et al. | ............... | 711/167 |
| 6,260,127 B1 | * | 7/2001 | Olarig et al. | ............... | 711/167 |
| 6,343,352 B1 | * | 1/2002 | Davis et al. | ................ | 711/158 |

* cited by examiner

Primary Examiner—Kevin L. Ellis
(74) Attorney, Agent, or Firm—Blakely, Sokoloff, Taylor & Zafman, LLP

(57) ABSTRACT

According to one aspect of the invention, a method is provided in which one or more write commands and their corresponding write data are received from a first device. The corresponding write data may be delayed by the first device by a first delay period. The one or more write commands and their corresponding write data are stored in a set of buffers. In response to another write command being received from the first device, a buffered write command and its corresponding write data are sent to a second device for execution, without waiting for the write data corresponding to said another write command to be sent from the first device.

34 Claims, 6 Drawing Sheets

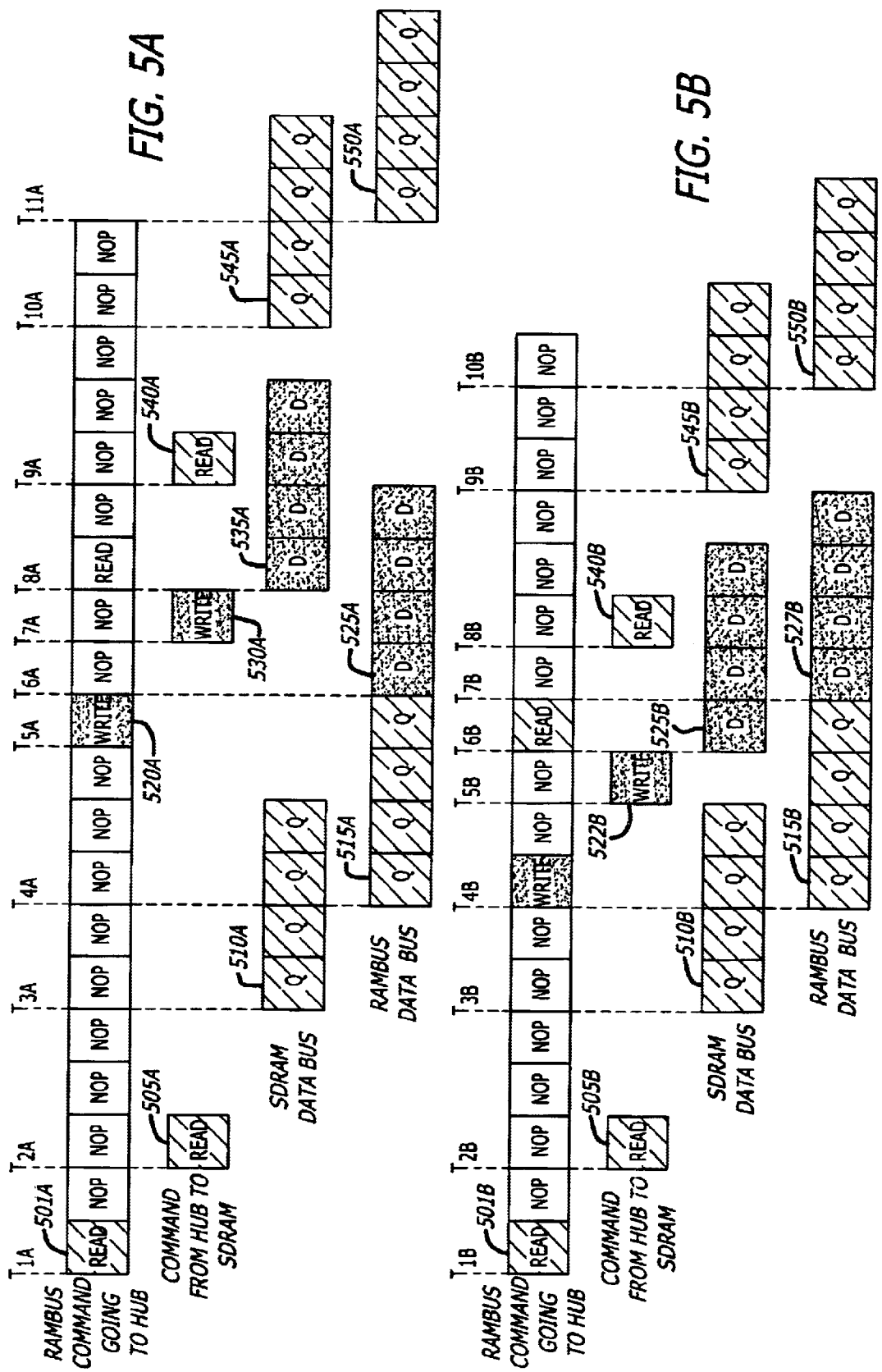

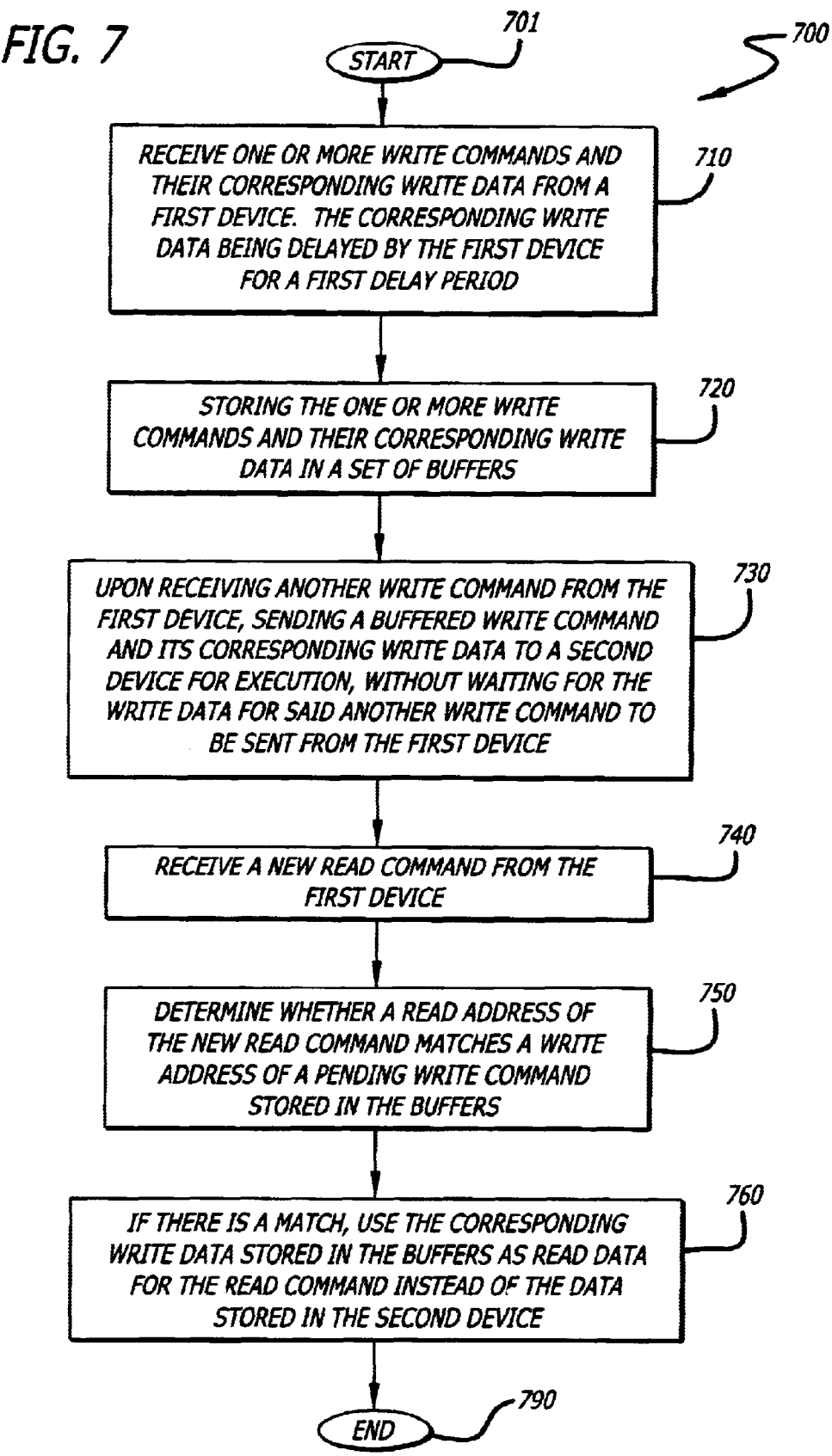

METHOD AND APPARATUS FOR UTILIZING WRITE BUFFERS IN MEMORY CONTROL/INTERFACE

FIELD OF THE INVENTION

The present invention relates to the field of memory control/interface. More specifically, the present invention relates to an apparatus, method, and system for utilizing write buffers to improve the performance of data transfer between a memory controller and memory devices.

BACKGROUND OF THE INVENTION

As computer devices and systems continue to advance and become more complex, effective and efficient management of the interface between different types of devices and components in any given system has become more and more critical in system design and implementation in order to achieve better system performance at component and system levels. With respect to memory control and interface, data transfer between one component (e.g., a processor) and another component (e.g., system memory devices) is typically controlled by a memory controller or a memory control unit that is responsible for servicing memory transactions (e.g., read, write, etc.) that target the system memory devices. Typically, the memory controller and the memory devices operate according to certain data transfer and memory control protocol/specification that is designed to control and service memory transactions between the memory controller and the memory devices. For example, memory transactions that target memory devices such as synchronous dynamic random access memory (SDRAM) devices are controlled by an SDRAM memory controller that operate according to SDRAM specification which includes specification for read, write and other memory operations. To service various types of memory transactions, a typical memory controller generates or issues specific memory commands (e.g., read, write, activate, refresh, etc.) to the memory devices to instruct the memory devices to perform certain operations according to the specific memory commands issued by the memory controller.

In certain systems, however, the memory controller used in the systems may be designed by one entity according to a specific specification and the memory devices may be designed by another entity according to a different specification. For example, the memory controller used in a given system may be a RAMBUS® memory controller designed by RAMBUS®, Inc. of Mountain View, Calif., and the memory devices used in the system may be SDRAM devices. In this case, an interface between the memory controller and the memory devices is used to allow the memory controller and the memory devices to communicate and interact with each other. In general, the interface (also called the translator herein) translates the memory commands issued by the memory controller according to one protocol/specification into commands according to another protocol/specification that can be understood by the memory devices. Likewise, the interface or translator receives the data from the memory devices according to the protocol/specification used by the memory devices and transmit the data to the memory controller according to the protocol/specification used by the memory controller. For example, a translator/interface unit can be used to facilitate the data transfer between a RAMBUS® memory controller and SDRAM devices. In this type of configuration, performance may not be optimized due to the different protocols/specifications that are specifically designed for certain types of devices. In other instances, even when a memory controller (e.g., a RAMBUS® memory controller) is designed to work specifically with certain memory devices (e.g., SDRAM devices), certain characteristics associated with the respective components may still cause poor utilization of the memory buses. For example, the RAMBUS® memory controller defers write data transfers on a write command until the read latency of the RAMBUS® type memory device (RDRAM) is met. This feature allows the RAMBUS® memory controller to maintain high bus utilization for RAMBUS® type memory devices. However, in a system in which the RAMBUS® memory controller/interface communicates with SDRAMs via a translator unit, the deferring of write data transfer by the RAMBUS) memory controller results in poor bus utilization because SDRAM devices require the write data to be sent with the write command. This RAMBUS® feature thus results in under-utilization of the SDRAM and the RAMBUS® memory bus because write commands must be delayed until the write data can be sent from the RAMBUS® memory controller to the SDRAM via the translator.

BRIEF DESCRIPTION OF THE DRAWINGS

The features and advantages of the present invention will be more fully understood by reference to the accompanying drawings, in which:

FIG. 5A shows a timing diagram of memory utilization with no write buffers;

FIG. 5B shows a timing diagram of memory utilization with write buffers;

FIG. 7 shows a flow diagram of one embodiment of a method according to the teachings of the present invention.

DETAILED DESCRIPTION

Figure 1:
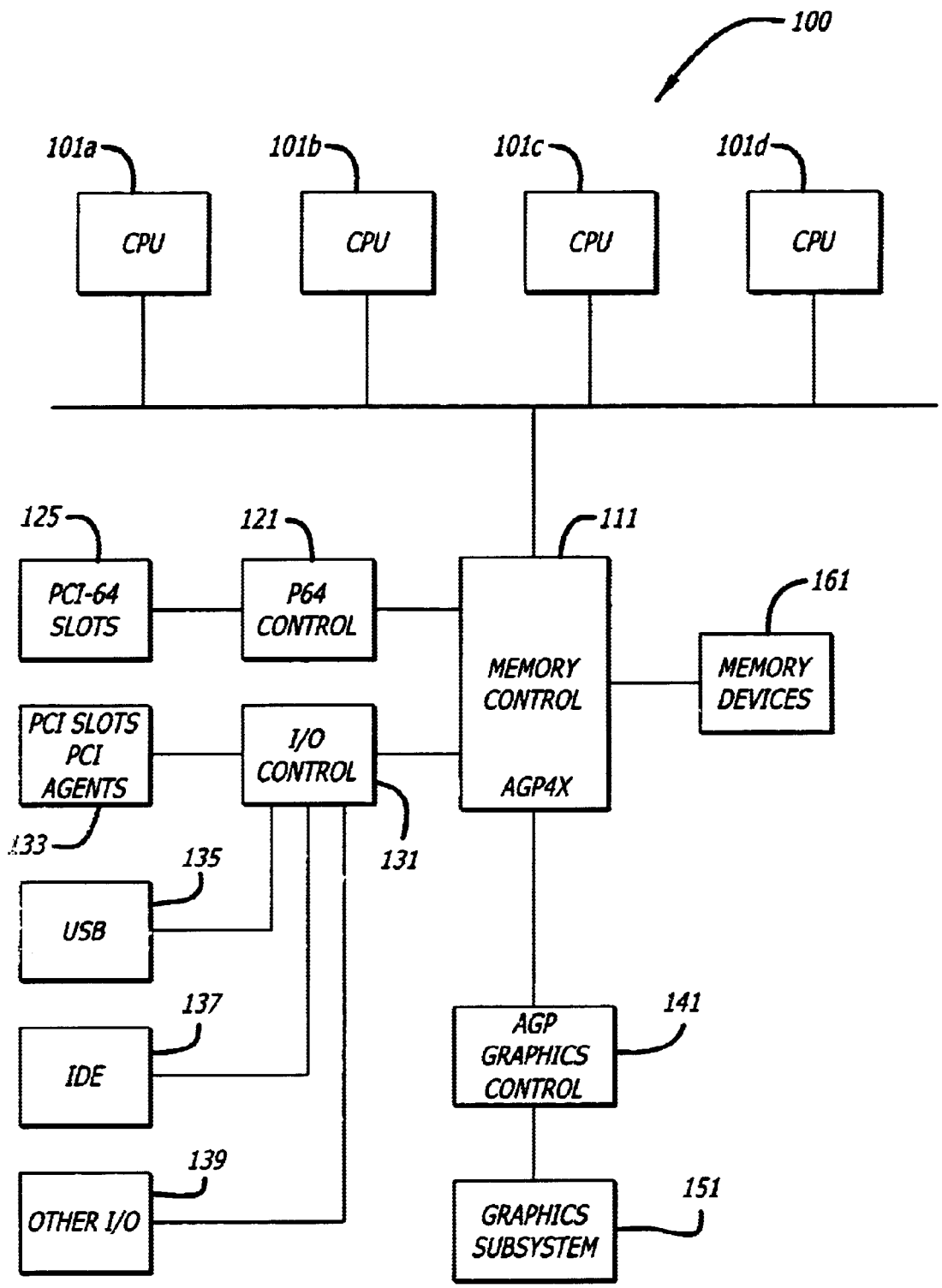
FIG. 1 is a block diagram of one embodiment of a system implementing the teachings of the present invention.

In the following detailed description numerous specific details are set forth in order to provide a thorough understanding of the present invention. However, it will be appreciated by one skilled in the art that the present invention may be understood and practiced without these specific details.

In the discussion below, the teachings of the present invention are utilized to implement a method, apparatus, system, and machine-readable medium for utilizing write buffers to improve the performance of data transfer between a memory controller and memory devices. In one embodiment, one or more write commands and their corresponding write data are received from a first device. The corresponding write data may be delayed by the first device by a first delay period. The one or more write commands and their corresponding write data are stored in a set of buffers.

Upon another write command is received from the first device, a buffered write command and its corresponding write data are sent to a second device for execution, without waiting for the write data corresponding to said another write command to be sent from the first device. In one embodiment, the first delay period corresponds to a read latency of a previous read command issued by the first device. In one embodiment, the set of buffers includes one or more buffers to store the respective write commands and one or more buffers to store the respective write data. In one embodiment, the one or more buffers to store the respective write commands include a buffer to store row addresses corresponding to the respective write commands and a buffer to store column addresses corresponding to the respective write commands. In one embodiment, the buffered write commands are executed by the second device on a first-in-first-out basis. Upon said another write command is received from the first device, an oldest write command stored in the buffers is popped from the buffers and sent to the second device for execution and said another write command is pushed onto the top of the buffers. In one embodiment, the first device is a memory controller that operates according to a first specification and the second device includes one or more memory devices that operate according to a second specification. In one embodiment, the memory controller is a RAMBUS type memory controller that operates according to RAMBUS memory control specification and the memory devices are synchronous dynamic random access memory (SDRAM) devices that operate according to SDRAM specification. In one embodiment, the SDRAM devices are double data rate synchronous dynamic random access memory (DDR-SDRAM) devices that operate according to DDR-SDRAM specification. The teachings of the present invention are applicable to any scheme, method and system for memory control and interface in computer systems that utilize memory controller(s) according to RAMBUS specification and various types of SDRAM devices according to various types of SDRAM specifications including DDR-SDRAM specification. However, the teachings of the present invention are not limited to RAMBUS type memory controllers and SDRAM type devices and can be applied to any scheme, method, and system of memory control and interface in which a memory controller operates according to one specification and memory devices operate according to another specification. The teachings of the present invention are applicable to any pipelined set of time multiplexed bi-directional buses.

FIG. 1 shows a block diagram of one embodiment of a system configuration in which the teachings of the present invention are implemented. The system configuration 100 includes a plurality of central processing units (CPUs) 101a–d, a memory control hub (also referred to as memory control unit) 111, a P64 control unit 121, an Input/Output (IO) control unit 131, a graphics controller 141 coupled to a graphics subsystem 151, and a plurality of memory devices 161. For the purposes of the present specification, the term "processor" or "CPU" refers to any machine that is capable of executing a sequence of instructions and shall be taken to include, but not be limited to, general purpose microprocessors, special purpose microprocessors, multimedia controllers and microcontrollers, etc. In one embodiment, the CPUs 101a–101d are general-purpose microprocessors that are capable of executing an Intel Architecture instruction set. The CPUs 101a–101d, the P64 control unit 121, the IO control unit 131, and the AGP graphics control unit 141 access the system memory devices 161 via the memory control unit 111. The memory control unit 111, in one embodiment, is responsible for servicing all memory transactions that target the system memory devices 161. The memory control unit 111 can be a stand-alone unit, an integrated part of a chipset, or a part of some larger unit that control the interfaces between various system components and the system memory devices 161. The P64 control unit 121 provides the interface control between a plurality of PCI-64 slots 125 and the memory control unit 111. The IO control unit 131 provides the interface control between the memory unit 111 and various IO devices and ports including the PCI slots and PCI agents 133, a plurality of USB ports 135, a plurality of IDE ports 137, and other IO devices 139. The AGP graphics control unit 141 provides the interface control between the graphics subsystem 151 and the memory control unit 111. The structure and functions of the memory control unit 111 are described in greater details below.

Figure 2:
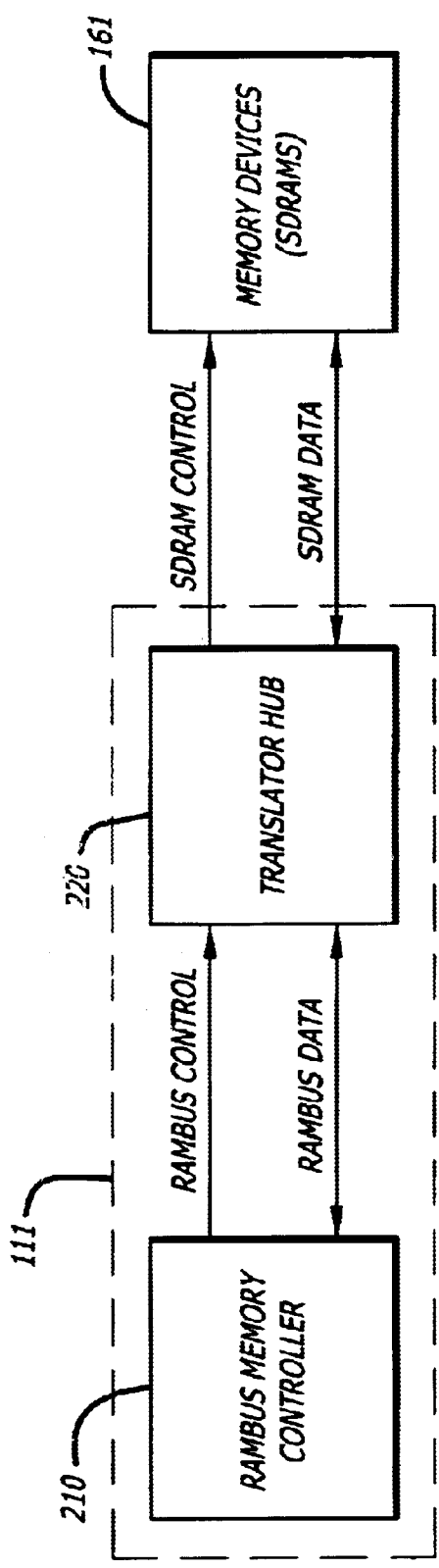
FIG. 2 shows a block diagram of one embodiment of a memory controller configuration in which the teachings of the present invention are implemented.

FIG. 2 shows a block diagram of one embodiment of a memory control configuration according to the teachings of the invention. As shown in FIG. 2, the memory control unit 111 includes a memory controller 210 and a translator hub 220 that acts as an interface between the memory controller 210 and the memory devices 161. For explanation and illustration purposes, the memory controller 210 is assumed to be a RAMBUS memory controller that operates according to RAMBUS memory control/interface specification and the memory devices 161 are assumed to be SDRAM devices that operate according to SDRAM specification. It should be recognized by one skilled in the art, however, that the teachings of the present invention are not limited to RAMBUS memory controllers and SDRAM devices and can be applied to other memory configurations which utilize memory controllers that operate in accordance with one specification and memory devices that operate according to another specification. As shown in FIG. 2, the translator hub 220 translates the RAMBUS control signals and RAMBUS data signals into SDRAM control signals and SDRAM data signals and vice-versa to facilitate data transfer between the memory controller 210 and the memory devices 161. In other words, the translator hub 220 provides a mechanism for tunneling SDRAM transactions between the RAMBUS memory controller 210 and the SDRAM devices 161. As described above, the RAMBUS® memory controller defers write data transfers on a write command until the read latency of the RAMBUS type memory device (RDRAM) is met. This feature allows the RAMBUS memory controller to maintain high bus utilization for RAMBUS type memory devices. However, in a system in which a RAMBUS memory controller/interface communicates with SDRAMs via a translator unit, the deferring of write data transfer by the RAMBUS memory controller results in poor bus utilization be cause SDRAM devices require the write data to be sent with the write command. This RAMBUS feature thus results in under-utilization of the SDRAM and the RAMBUS memory controller because write commands must be delayed until the write data can be sent from the RAMBUS memory controller to the SDRAM via the translator. The present invention utilizes write buffers to solve this problem and thus improve the data transfer performance between a RAMBUS type memory controller and SDRAM type memory devices. In one embodiment, the translator hub 220 includes a set of write buffers that are used to store write commands and the corresponding write data issued by the memory controller 210. The buffered write commands are then executed on a first-in-first-out basis. Thus, the write buffers act as a first-in-first-out queue to control and facilitate data transfer between the RAMBUS memory controller 210 and the SDRAM devices 161 in which new write commands are pushed onto the queue while the oldest write command stored in the write buffers is popped to the SDRAM devices 161 for execution. In other words, the SDRAM devices 161 can start a write operation based upon the buffered write commands when a new write command is received without waiting for the write data for the new write command to be sent from the RAMBUS memory controller 210. The structure and operations of the write buffers are described in more detail below.

Figure 3:
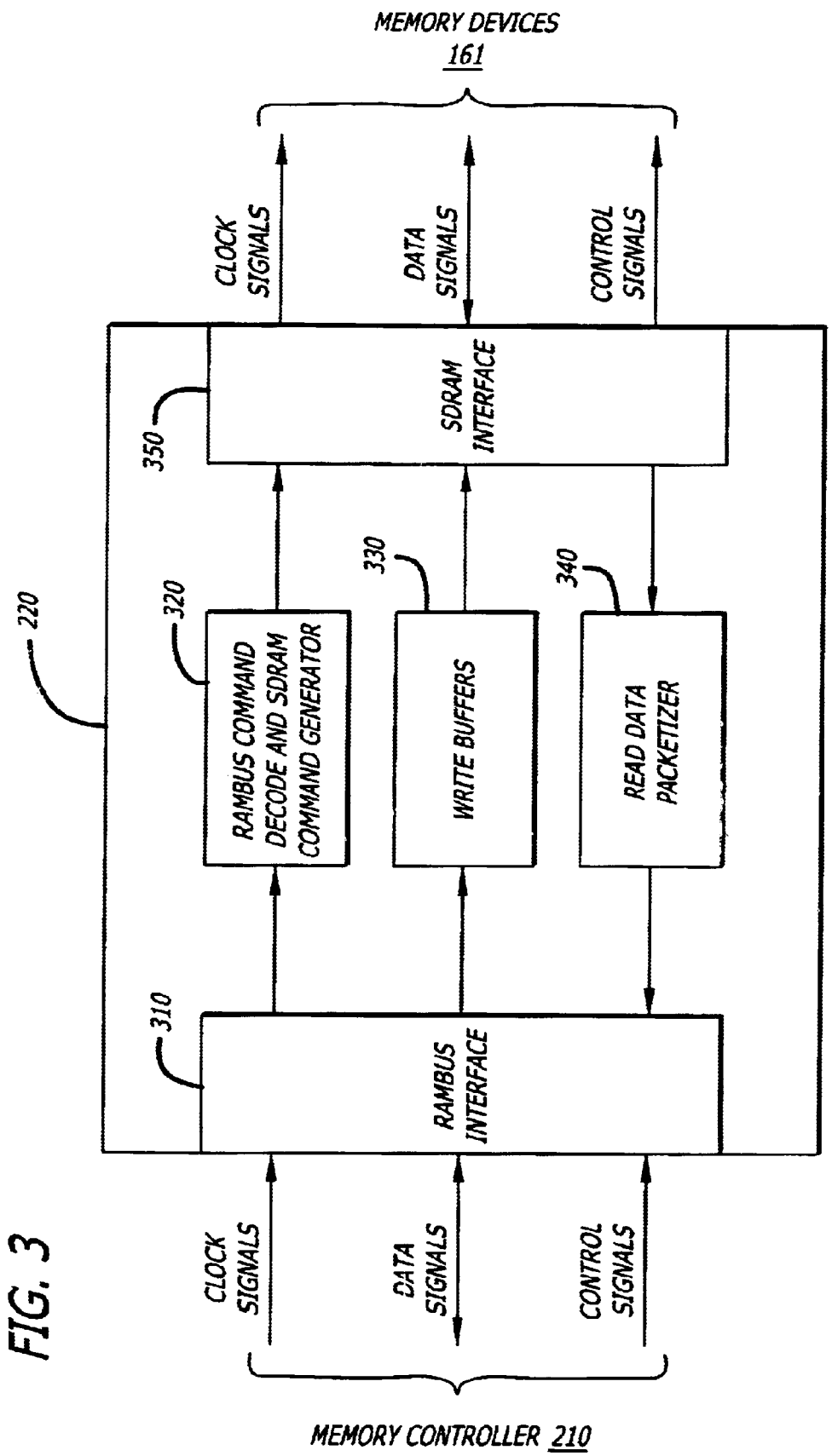
FIG. 3 is a block diagram of one embodiment of a translator hub in accordance with the teachings of the present invention.

FIG. 3 is a block diagram of one embodiment of the translator hub 220 according to the teachings of the present invention. As shown in FIG. 3, the translator hub includes a channel (also referred to as a main channel herein) that acts as an interface with the RAMUBS memory controller 210 and one or more channels (also referred to as branch channels herein) that act as interface with the SDRAM devices 161. In one embodiment, the main channel 310 is coupled to receive control signals, data signals, and clock signals from the RAMBUS memory controller 220 and to send the data signals to the RAMBUS memory controller 220. In one embodiment, the branch channels 340 are coupled to send control, data, and clock signals to the SDRAM devices 161 and to receive data from the SDRAM devices 161. The translator hub further includes a decode and SDRAM command generator unit 320 that decodes the commands received from the RAMBUS memory controller 210 via the main channel 310 and generates the appropriate SDRAM commands based upon the decoded commands. The SDRAM commands generated are sent to the SDRAM devices 161 via the branch channels 350. As shown in FIG. 3, the translator hub also includes data write buffers 330 to store write data received from the RAMBUS memory controller 210. As described herein, the buffered write data and the buffered write commands are sent to the SDRAM devices 161 for execution on a first-in-first-out basis when a new write command is received from the RAMBUS memory controller 210 without waiting for the write data for the new write command. The translator hub further includes a read data packetizer unit 340 to convert data received from the SDRAM devices 161 via the branch channels 350 into main channel data packets to be sent to the RAMBUS memory controller 210.

Figure 4:
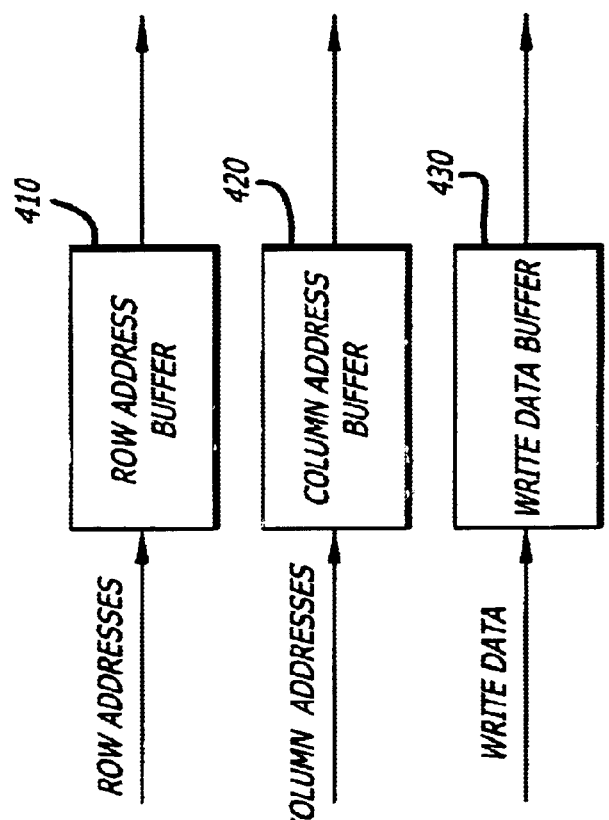
FIG. 4 shows a block diagram of one embodiment of write buffer configuration according to the teachings of the present invention.

FIG. 4 illustrates a block diagram of one embodiment of the configuration of the write buffers according to the teachings of the present invention. In this embodiment, the write buffers include a row address buffer (also called row address FIFO herein) 410, a column address buffer (also called column address FIFO herein) 420, and a write data buffer (also called write data FIFO herein) 430. The row address buffer 410 and column address buffer 420 are used to store the row and column addresses associated with the write commands, respectively. The write data buffer 430 is used to store the write data associated with the write commands. In one embodiment, the three buffers shown in FIG. 4 are configured to function as first-in-first-out queues. In one embodiment, the row address FIFO 410 is advanced with activate memory commands, the column address FIFO 420 is advanced on write commands and the write data FIFO 430 is advanced when the delayed write data is sent.

FIG. 5A shows a timing diagram of memory utilization without write buffer and FIG. 5B show a timing diagram of memory utilization with write buffer. As shown in FIG. 5A, because the RAMBUS memory controller (e.g., the RAMBUS memory controller 210 shown in FIG. 2) defers write data transfer on a write command until the read latency of a previously issued read command is met, the execution of a write command is delayed by a period corresponding to the read latency of a previous read command. For example, as shown in FIG. 5A, at time T1A, a read command 501A is sent from the RAMBUS memory controller 210 to the translator hub 220. At time T2A, a read command 505A (which is the SDRAM read command corresponding to the read command 501A) is sent from the translator hub 220 to the SDRAM devices 161. At time T3A, the corresponding read data 510A with respect to the read command 505A is transmitted from the SDRAM devices 161 to the translator hub 220. At time T4A, read data 515A (which is read data 510A converted into an appropriate format by the translator hub 220) is transmitted from the translator hub 220 to the RAMBUS memory controller 210. At time T5A, a write command 520A is sent from the RAMBUS memory controller 210 to the translator hub 220. At time T6A, the write data 525A associated with the write command 520A is transmitted from the RAMBUS memory controller 210 to the translator hub 220. Again, the RAMBUS memory controller 210 defers write data transfer on a write command until the read latency of a previous read command is met. In this example, the write data 525A is not sent until time T6A which is when the read latency with respect to the read command 501A has been met. At time T7A, a write command 530A (which is the SDRAM write command corresponding to the write command 520A) is sent to the SDRAM devices 161 from the translator hub 220. At time T8A, write data 535A (which is write data 525A converted into an appropriate format by the translator hub 220) is transmitted to the SDRAM devices 161 from the translator hub 220. It can be seen from FIG. 5A that the delaying of write data transfer by the RAMBUS memory controller 210, without the use of write buffer according to the teachings of the present invention, results in poor memory bus utilization because there is a large gap (time delay) between the time during which the read data with respect to a read command (e.g., read data 510A) is transmitted over the SDRAM memory bus and the time during which the write data associated with a write command (e.g., write data 535A) is transmitted over the SDRAM memory bus. Similarly, it can be seen from FIG. 5A that there is a large gap (time delay) between the time during which the write data with respect to a write command (e.g., write data 525A) is transmitted over the RAMBUS memory bus and the time during which the read data associated with a subsequent read command (e.g., read data 550A) is transmitted over the RAMBUS memory bus.

Referring to FIG. 5B which illustrates the memory utilization with write buffers, it can be seen that the memory utilization has been improved significantly because a write command and its corresponding write data stored in the write buffer can be sent to the SDRAM devices 161 for execution when a new write command is received at the translator hub 220 from the RAMBUS memory controller 210, without waiting for the write data associated with the new write command to arrive from the RAMBUS memory controller 210. For example, as shown in FIG. 5B, at time T1A, a read command 501B is sent from the RAMBUS memory controller 210 to the translator hub 220. At time T2A, a read command 505B (which is the SDRAM read command corresponding to the read command 501B) is sent from the translator hub 220 to the SDRAM devices 161. At time T3A, the corresponding read data 510B with respect to the read command 505B is transmitted from the SDRAM devices 161 to the translator hub 220. At time T4A, read data 515B (which is read data 510B converted into an appropriate format by the translator hub 220) is transmitted from the translator hub 220 to the RAMBUS memory controller 210. At approximately time T4A, a new write command 520B is sent from the RAMBUS memory controller 210 to the translator hub 220. At time T5A, in response to the new write command 520B being received from the RAMBUS memory controller 210, a previous write command 522B stored in the write buffer is sent to the SDRAM devices 161. At time T6A, the buffered write data 525B associated with the write command 522B is transmitted to the SDRAM devices on the SDRAM data bus. At time T7A, the write data 527B associated with the new write command 520B is transmitted from the RAMBUS memory controller 210 to the translator hub 220. Again, the RAMBUS memory controller 210 defers write data transfer on a write command until the read latency of a previous read command is met. In this example, the write data 527BA is not sent until time T7A which is when the read latency with respect to the read command 501B has been met. However, as shown in FIG. 5B, the translator hub 220 does not need to wait for the write data associated with the new write command to arrive from the RAMBUS memory controller 210 to send a previous write command and its corresponding data stored in the write buffers to the SDRAM devices 161 for execution. In this example, the previous write data command 522B and its associated write data 525B stored in the write buffers are already sent to the SDRAM devices 161 before the new write data 527B is received from the RAMBUS memory controller 210. As a result, the gap (time delay) between the time during which the read data with respect to a read command (e.g., read data 510B) is transmitted over the SDRAM memory bus and the time during which the write data associated with a write command (e.g., write data 525B) is transmitted over the SDRAM memory bus has become much smaller. Similarly, it can be seen from FIG. 5B that the gap (time delay) between the time during which the write data associated with a write command (e.g., write data 527B) is transmitted over the RAMBUS memory bus and the time during which the read data associated with a subsequent read command (e.g., read data 550B) is transmitted over the RAMBUS memory bus has become much smaller. Thus, the use of write buffers significantly increases the memory utilization of both the SDRAM devices 161 and the RAMBUS memory controller 210. This is because a subsequent read after the write does not have to be delayed.

As described above, the write buffers used in the translator hub 220 contain data and addresses of pending write operations to the memory devices 161. A problem may occur if a read command or read memory request is sent to the translator hub 220 to read data from a memory address or location in the memory devices 161 to which one or more pending write commands stored in the buffered are directed. If the read command or read memory request is satisfied by retrieving data from the memory devices 161, the latest and freshest data will not be used because the corresponding pending write command in the write buffers has not been completed. For example, assuming that the data stored at location XXXX in the memory devices 161 is YYYY at time T0. At time T1, a write command and its corresponding data ZZZZ are stored in the write buffers to be written to the same memory location XXXX in the memory devices 161. At time T2, a read command is sent to the translator hub to read data from the same memory location XXXX from the memory devices 161. Assuming that at time T2, the write command stored in the write buffers has not been completed. Therefore the data at location XXXX has not been updated with the latest and freshest data ZZZZ. If the read command is satisfied by retrieving the data from the memory devices 161, the old data YYYY will be used instead of the freshest and latest data ZZZZ which is still pending in the write buffers. To solve this problem, the present invention provides a mechanism, called read bypass logic or read bypass operation herein, to use the pending write data stored in the write buffers instead of the data stored in the memory devices 161 as read data for a read command that targets the same memory address as one of the pending write commands stored in the write buffers. The read bypass logic/operation is described in more details below.

Figure 6:
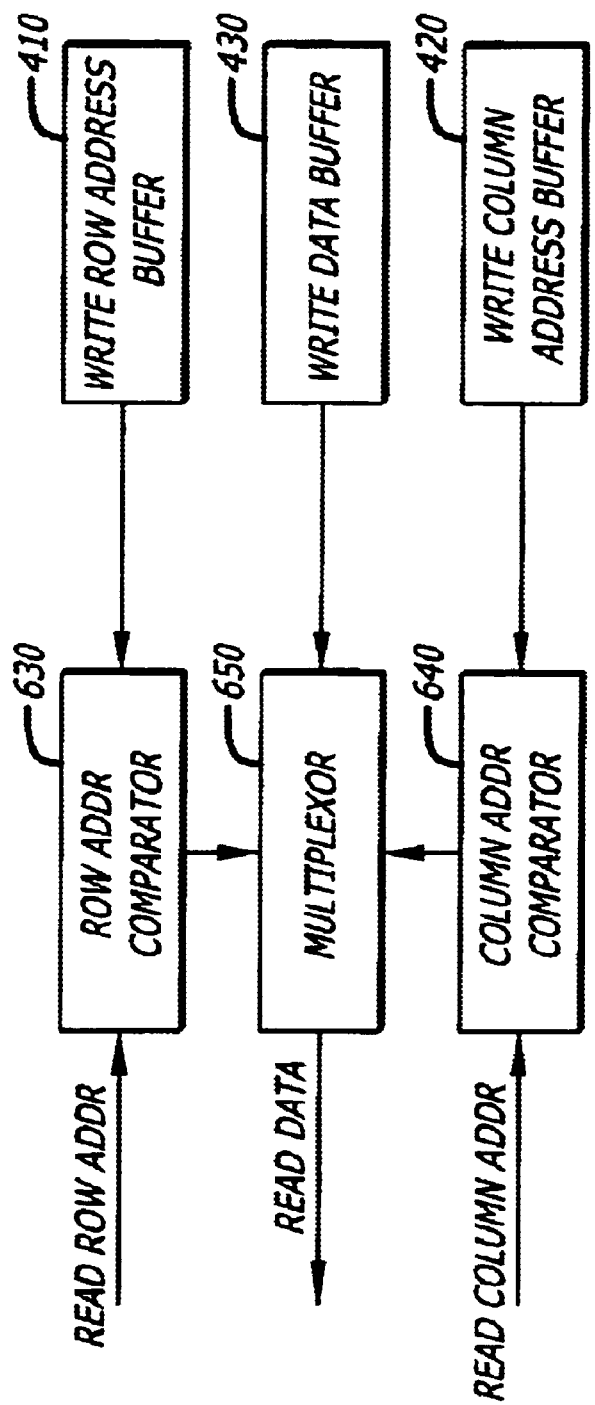
FIG. 6 shows a block diagram of one embodiment of read bypass logic in accordance with the teachings of the present invention.

FIG. 6 illustrates a block diagram of one embodiment of a read bypass logic/unit implemented within the translator hub 220 according to the teachings of the present invention. In one embodiment, the read-bypass unit comprises an address comparison logic to determine whether a read address associated with a read command received from the RAMBUS memory controller 210 matches a write address stored in the write buffers. In one embodiment, the address comparison logic includes a row address comparator 630 and a column address comparator 640. In this embodiment, the address is compared in two parts because the address is sent to the translator hub 220 from the RAMBUS memory controller 210 in two pieces. In one embodiment, an activate command provides the row address portion while a read/write command provides the column address portion. In this embodiment, there is a match if both the row address and the column address of the respective read command matches the row address and the column address of one of the write commands stored in the write buffers. The read bypass logic further includes a multiplexor 650 to select the corresponding write data the address of which matches the address of the respective read command. In the present embodiment, if the read address matches the write address in the write buffers, the corresponding write data stored in the write buffers will be used as the read data for the respective read command instead of data from the memory devices 161. Accordingly, if a read command is issued to read data from a memory address for which there is a pending write command in the write buffers, the write data stored in the write buffers will be used as read data for the respective read command to ensure that the latest and freshest is obtained since the pending write command has not yet been completed.

FIG. 7 shows a flow diagram of one embodiment of a method 700 according to the teachings of the present invention. At block 710, one or more write commands and their corresponding write data are received from a first device (e.g., the RAMBUS memory controller 210). The write data transfer is deferred by the first device by a first delay period. In one embodiment, the first delay period corresponds to the read latency of a previous read command. At block 720, the one or more write commands are stored in a set of buffers. At block 730, upon receiving another write command from the first device, a buffered write command and its corresponding write data are sent to a second device (e.g., the memory devices 161) for execution, without waiting for the write data for said another write command to be sent from the first device. At block 740, a new read command is received from the first device. At block 750, it is determined whether the read address of the new read command matches a write address of a pending write command stored in the buffers. At block 760, if there is a match, the corresponding write data stored in the buffers is used as read data for the new read command instead of the data stored in the second device.

The invention has been described in conjunction with the preferred embodiment. It is evident that numerous alternatives, modifications, variations and uses will be apparent to those skilled in the art in light of the foregoing description.

What is claimed is:

1. A method comprising:
receiving one or more write commands and their corresponding write data from a first device, the corresponding write data being delayed by the first device by a first delay period;
storing the one or more write commands and their corresponding write data in a set of buffers; and
upon receiving another write command from the first device,
translating one of the one or more write commands stored in the set of buffers into a buffered write command for a memory device, and
sending the buffered write command and its corresponding write data to the memory device for execution, without waiting for another write data corresponding to said another write command to be sent from the first device.

2. The method of claim 1 wherein
the first delay period corresponds to a read latency of a previous read command.

3. The method of claim 1 wherein the set of buffers comprises
a first buffer to store the respective write data,
a second buffer to store row addresses corresponding to the respective write commands, and
a third buffer to store column addresses corresponding to the respective write commands.

4. The method of claim 1 wherein
the buffered write commands are executed by the memory device on a first-in-first-out basis.

5. The method of claim 4 wherein,
upon receiving said another write command from the first device,
an oldest write command stored in the buffers is popped from the buffers and sent to the memory device for execution and
said another write command is pushed onto the top of the set of buffers.

6. The method of claim 1 wherein
the first device comprises a memory controller.

7. The method of claim 6 wherein
the memory controller is RAMBUS memory controller that operates according to a RAMBUS memory control specification.

8. The method of claim 6 wherein
the memory device is a synchronous dynamic random access memory (SDRAM) that operates according to an SDRAM specification.

9. The method of claim 1 further comprising:
receiving a new read command from the first device;
determining whether a read address associated with the new read command matches a write address associated with a write command stored in the set of buffers; and
if there is a match,
performing a read bypass operation to use the corresponding write data stored in the buffers as read data for the new read command instead of data stored in the memory device.

10. The method of claim 9 wherein
the read address and the write address each comprises a respective row address and a respective column address.

11. The method of claim 10 wherein
the determining comprises:
comparing the row address associated with the new read command to the row address associated with the write command; and
comparing the column address associated with the new read command to the column address associated with the write command.

12. The method of claim 9 wherein
the performing the read bypass operation comprises:
selecting the corresponding write data from the buffers; and
transmitting the corresponding write data to the first device as read data for the new read command.

13. An apparatus comprising:
a set of buffers to store one or more write commands and their corresponding write data received from a first device,
the corresponding write data being delayed by the first device by a first delay period,
wherein, upon receiving another write command from the first device,
one of the one or more write commands stored in the set of buffers is translated into a buffered write command, and
the buffered write command and its corresponding data are sent to a second device for execution, without waiting for the write data of said another write command to be sent from the first device.

14. The apparatus of claim 13 further comprising:
logic to perform a read bypass operation, the logic comprising:
logic to determine whether a read address associated with a new read command received from the first device matches a write address associated with a write command stored in the set of buffers; and
logic to use the corresponding write data stored in the set of buffers as read data for the new read command instead of data stored in the second device if there is a match.

15. The apparatus of claim 14 wherein the read address and the write address each comprises
a respective row address and
a respective column address.

16. The apparatus of claim 15 wherein
the logic to determine comprises:
a first comparator to compare the row address associated with the new read command to the row address associated with the write command; and
a second comparator to compare the column address associated with the new read command to the column address associated with the write command.

17. The apparatus of claim 14 wherein
the logic to perform the read bypass operation further comprises:
a multiplexor to select the corresponding write data from the buffers; and
logic to transmit the corresponding write data to the first device as read data for the new read command.

18. The apparatus of claim 13 wherein
the set of buffers comprises
a first buffer to store the respective write data,
a second buffer to store row addresses corresponding to the respective write commands, and
a third buffer to store column addresses corresponding to the respective write commands.

19. The apparatus of claim 13 wherein,
upon receiving said another write command from the first device,
an oldest write command stored in the buffers is popped from the set of buffers and sent to the second device for execution, and
said another write command is pushed onto the top of the set of buffers.

20. The apparatus of claim 13 wherein
the first device comprises a memory controller, and
the second device comprises a memory device.

21. The apparatus of claim 13 wherein
the first delay period corresponds to a read latency of a previous read command.

22. A memory control unit comprising:
a first memory controller to issue read and write commands to access a first memory device, the first memory controller to defer write data transfer on a write command for a period corresponding to a read latency of a previously issued read command;
wherein the first memory device requiring write data to be sent with a write command to execute a write operation to store the respective write data into the first memory device; and
a translator unit coupled to the first memory controller and the first memory device to provide signal translation between the first memory controller and the first memory device to facilitate memory transactions between the first memory controller and the first memory device, the translator unit including
a set of buffers to store one or more write commands and their corresponding write data received from the first memory controller,
the translator unit to send a buffered write command and its corresponding write data to the first memory device for execution upon receiving another write command from the first memory controller, without waiting for the write data corresponding to said another write command to be sent from the first memory controller.

23. The memory control unit of claim 22 wherein
the translator unit further includes logic to perform a read bypass operation, the logic comprising:
logic to determine whether a read address associated with a new read command received from the first device matches a write address associated with a write command stored in the buffers; and
logic to use the corresponding write data stored in the buffers as read data for the new read command instead of data stored in the second device if there is a match.

24. The memory control unit of claim 23 wherein
the read address and the write address each comprises a respective row address and a respective column address.

25. The memory control unit of claim 24 wherein
the logic to determine comprises:
a first comparator to compare the row address associated with the new read command to the row address associated with the write command; and
a second comparator to compare the column address associated with the new read command to the column address associated with the write command.

26. The memory control unit of claim 24 further including:
a multiplexor to select the corresponding write data from the buffers as read data for the new read command.

27. The memory control unit of claim 22 wherein
the set of buffers comprises:
a first buffer to store write data associated with write commands received from the first memory controller;
a second buffer to store row addresses associated with write commands received from the first memory controller; and
a third buffer to store column addresses associated with write commands received from the first memory controller.

28. A system comprising:
one or more processors;
a system memory; and
a memory control unit coupled to the one or more processors and the system memory, the memory control unit comprising:
a memory controller; and
a translator unit coupled between the memory controller and the system memory, the translator unit to provide an interface between the memory controller and the system memory, the translator unit comprising:
a set of buffers to store write commands and corresponding write data received from the memory controller, a write command and its corresponding write data stored in the set of buffers being sent to the system memory for execution, upon receiving another write command from the memory controller and without waiting for the write data corresponding to the another write command to be sent from the memory controller.

29. The system of claim 28 wherein
the translator unit further comprises:
read bypass logic including
logic to determine whether a read address associated with a subsequent read command received from the first device matches a write address associated with a write command stored in the buffers; and
logic to use the corresponding write data stored in the buffers as read data for the subsequent read command instead of data stored in the second device if there is a match.

30. The system of claim 28 wherein
the memory controller defers sending write data associated with a write command for a period corresponding to a read latency of a previously issued read command, and
wherein the system memory requires that write data associated with a write command be sent with the respective write command to the system memory for the system memory to perform a corresponding write operation.

31. The method of claim 1 wherein
the translating includes translating the one of the one or more write commands of a first protocol from the first device into buffered write commands of a second protocol for the memory device, the second protocol differing from the first protocol.

32. The apparatus of claim 13 further comprising:
a translator to translate the one or more write commands in a first protocol associated the first device into a second protocol differing from the first, the second protocol associated with the second device.

33. The memory control unit of claim 23 wherein the translator unit further to translate the buffered write command and its corresponding write data from one protocol associated with the first memory controller into another protocol associated with the first memory device differing from the one protocol associated with the first memory controller.

34. The system of claim 28 wherein the translator unit further to translate the write command and its corresponding write data from one protocol associated with the memory controller into another protocol associated with the system memory differing from the one protocol associated with the memory controller.

* * * * *